May 4, 1954
C. O. WENZEL
2,677,312
MILLING MACHINE
Filed Oct. 11, 1949
3 Sheets-Sheet 3
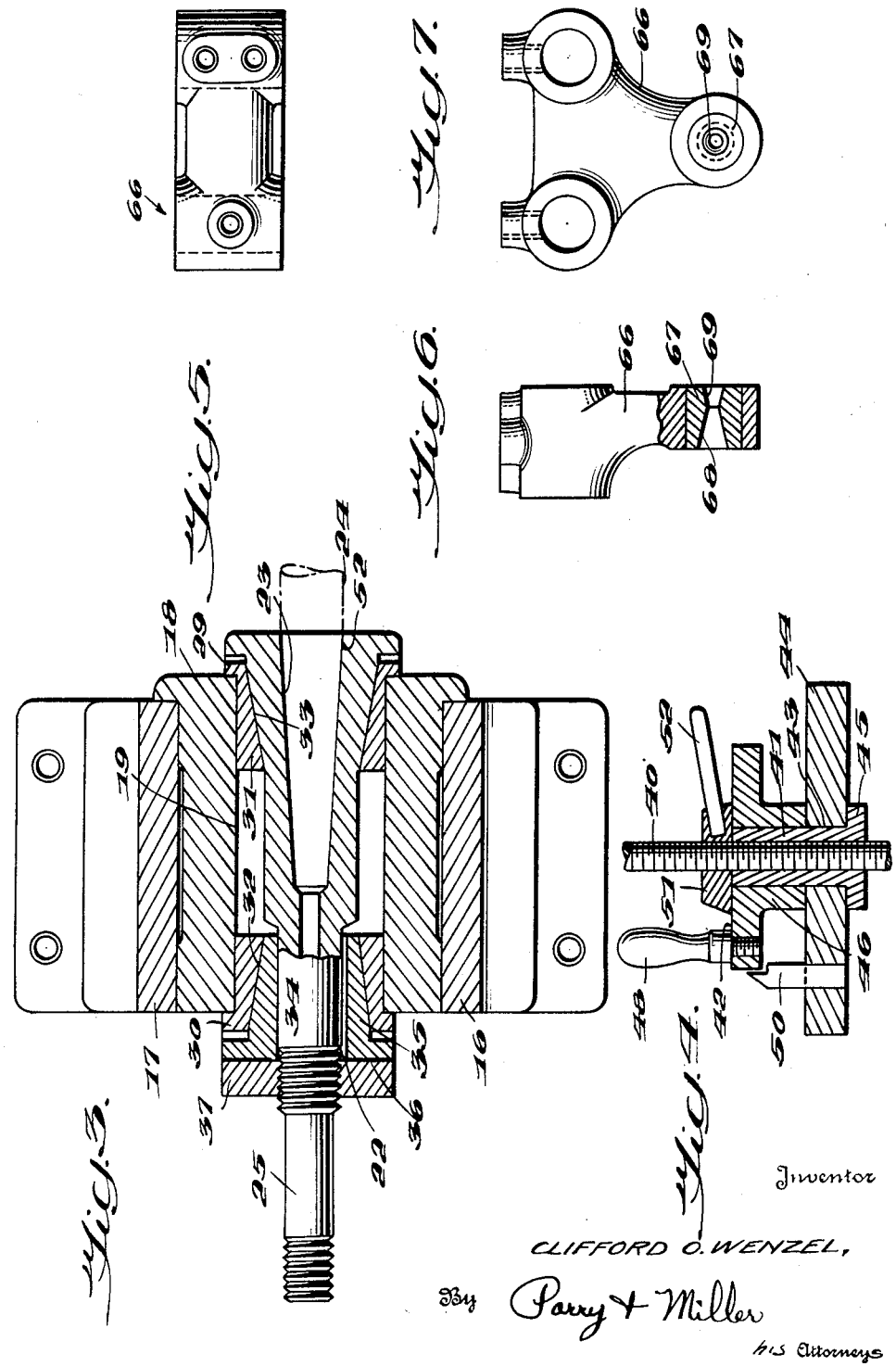
Inventor
CLIFFORD O. WENZEL,
By Parry + Miller
his Attorneys Patented May 4, 1954

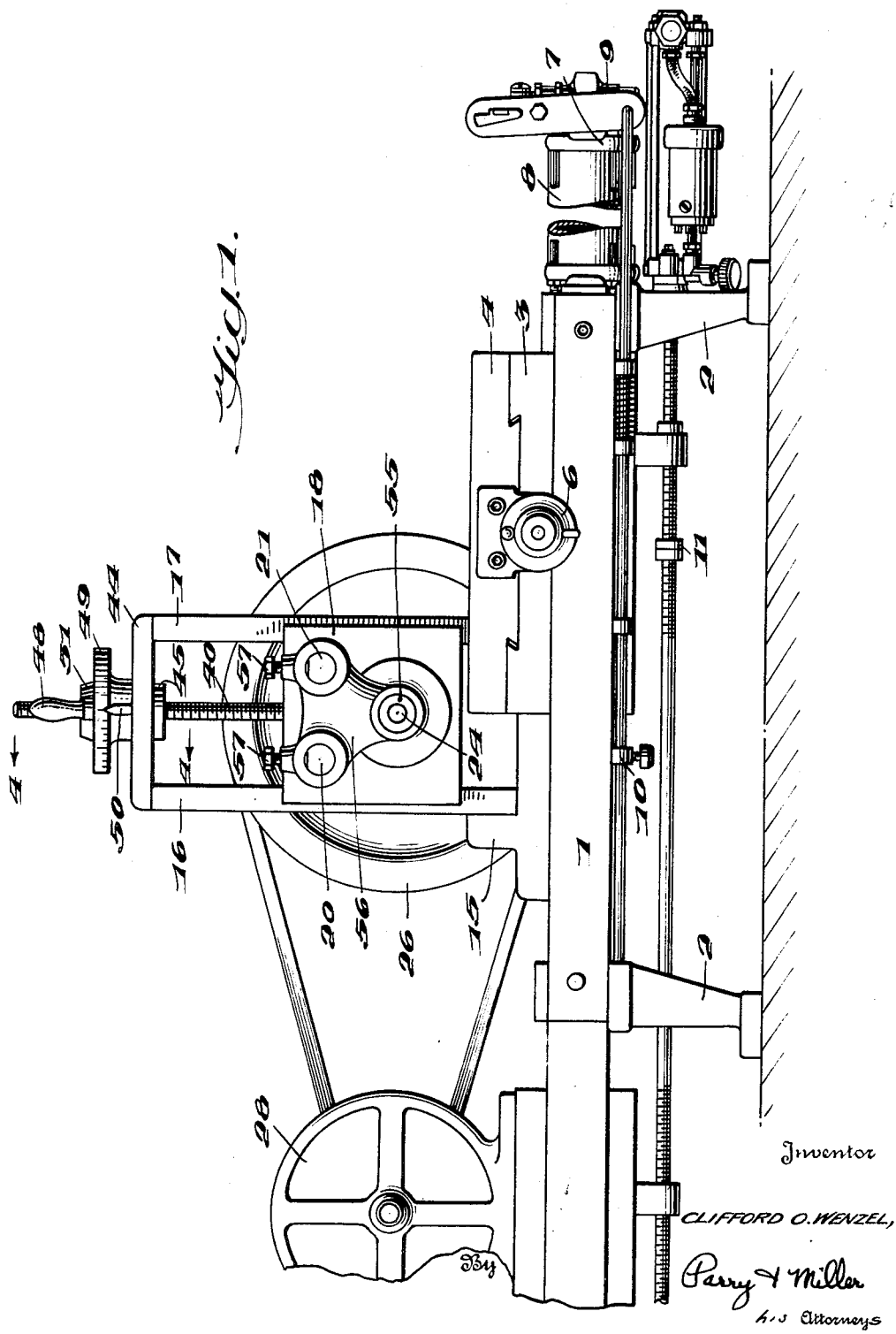

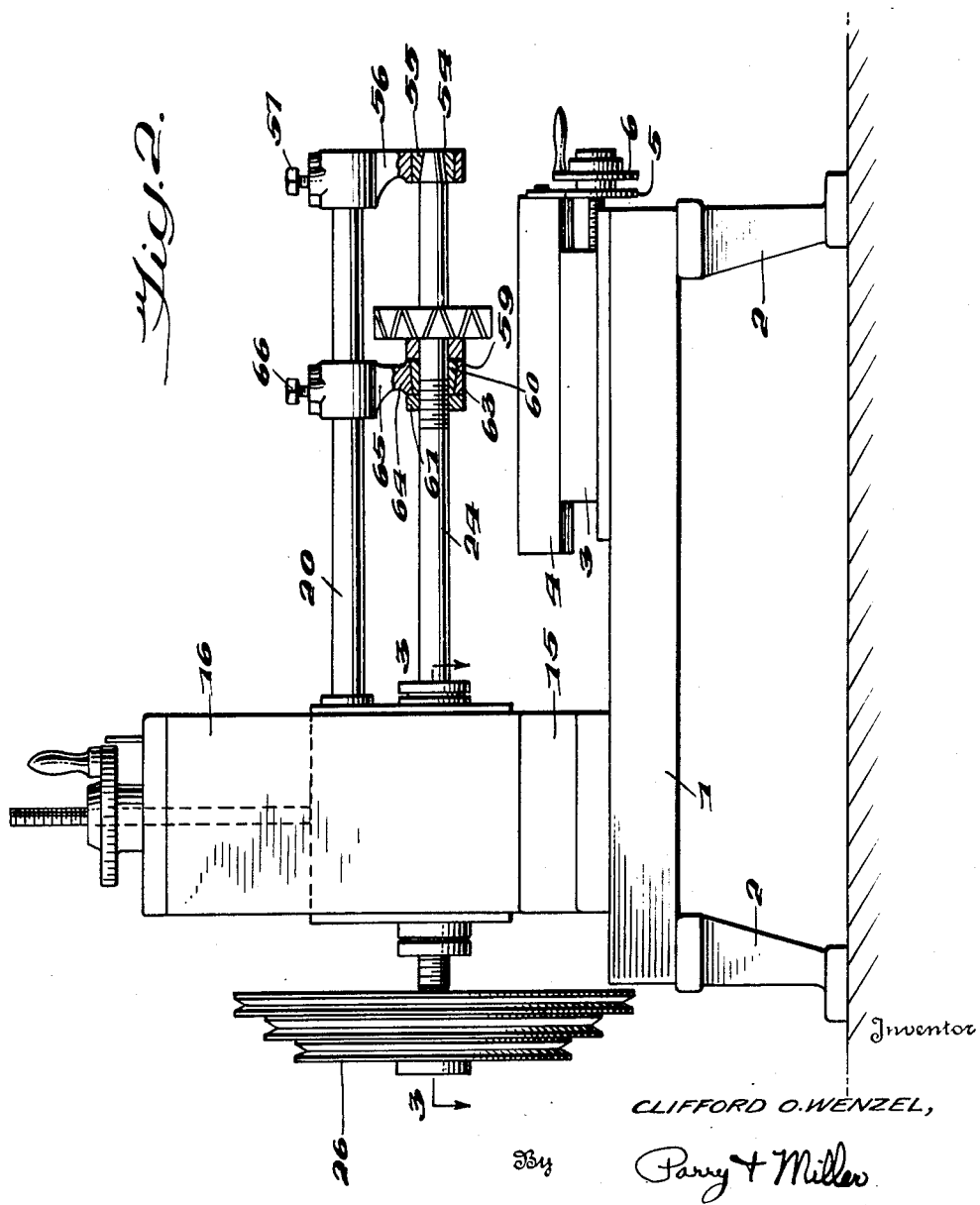

2,677,312

UNITED STATES PATENT OFFICE 2,677,312

MILLING MACHINE

Clifford Otto Wenzel, Belvidere, Ill.

Application October 11, 1949, Serial No. 120,692

4 Claims. (Cl. 90—16)

This invention relates to milling machines and aims generally to improve the mounting of the cutter and associated structure of milling machines.

A primary object of this invention is to provide an improved structural arrangement for the mounting and support of a cutter or tool relative to a work support, while permitting their relative adjustment and with improved convenience of adjustment and clamping.

Another object of the invention is the provision of an improved milling machine in which the work table travels in a horizontal path and relative vertical adjustment of the work and tool is obtained by moving the tool spindle.

Still another object of the invention is the provision of improved bearing supports for the arbors of milling machines which will effectively support the arbor in such a manner as to resist cutting stresses and strains and which may be simply adjusted to take up wear thereby insuring a smooth chatterless rotation of the arbor in its bearing and long life of the machine.

A further object of the invention is the provision of an improved spindle construction for milling machines wherein the spindle is held against longitudinal movement in its bearing support and wherein the bearing support may be simply adjusted to take up wear thereby insuring an accurate fit of the spindle in its bearing structure at all times.

A still further object of the invention is the provision of a taper center support for the cutter arbors of milling machines which may be adjusted for wear and which supports the arbor closely adjacent the cutter to prevent chattering of the arbor shaft.

These and other objects and advantages of the invention will be apparent to those skilled in the art from a consideration of the accompanying drawings and annexed specification illustrating and describing a preferred embodiment of the invention.

In the drawings:

Fig. 1 is a front elevational view of the improved milling machine in accordance with the present invention;

Fig. 2 is an end view of the machine looking from the left in Fig. 1, the motor being omitted to more clearly show the cutter mounting structure;

Fig. 3 is an enlarged horizontal cross-sectional view of the spindle and slide assembly taken on the line 3—3 of Fig. 2;

Fig. 4 is an enlarged cross-sectional view of the mechanism for vertically adjusting the cutter and cutter mechanism taken on the line 4—4 of Fig. 1;

Fig. 5 is a top view of a modified form of arbor support pendant;

Fig. 6 is a side view partly in section of the arbor support of Fig. 5; and,

Fig. 7 is an end view of the arbor support shown in Fig. 5.

Referring now to the drawings the improved milling machine according to the present invention comprises a base or support 1 provided with suitable legs 2 and carrying a work supporting table 3 slidably mounted thereon for movement longitudinally of the base. The table 3 has a work supporting portion 4 mounted for movement transversely of the base by the screw 5 and handwheel 6.

The table 3 is preferably reciprocated on the base 1 by a hydraulic mechanism 7 comprising a cylinder 8 having a piston and piston rod therein connected to the work table and a valve mechanism 9 adapted to control the flow of fluid to the cylinder. The valve mechanism 9 is actuated by the stops 10 and 11 in response to movement of the work table 3, the arrangement being such that there is a fast approach to the cutting position, a slower speed while the cut is being made, and a quick return after the cut is completed. Any suitable type of manual or hydraulic means may be used for reciprocating the work table 3. However, the hydraulic mechanism shown or any similar type which will perform the same functions is preferred.

Fixed on the base 1, adjacent the side of the table 3, is a support member or head 15 having upstanding guide portions 16 and 17 spaced apart in the direction of longitudinal travel of table 3 and between which a spindle carrier or support 18 is closely fitted for vertical sliding movement. The carrier 18 has a horizontal bore 19 for housing the spindle assembly and carries the overarms 20 and 21 which project outwardly therefrom over the path of travel of the work table to support the arbor pendants as will be apparent hereinafter.

The spindle assembly comprises a spindle 22 having a tapered bore 23 in one end thereof to receive the tapered end of the cutter arbor 24 and a reduced portion 25 at the other end thereof to receive a stepped pulley 26 which is belt driven by a similar but smaller stepped pulley on the shaft of the motor 28 to rotate the spindle at a variety of speeds determined by the relative sizes of the stepped pulleys.

The spindle 22 is rotatably mounted in oilite or similar type bearings 29 and 30 secured in the ends of the bore 19. The inner surfaces of the bearings 29 and 30 taper outwardly as shown at 31 and 32 in Fig. 3 and are adapted to cooperate respectively with similarly tapered portions 33 and 34 of the spindle 22 and of a sleeve 35 which is slidably mounted on the spindle 22 and keyed thereto by the key 36. A nut 37 is screw-threadedly engaged with the spindle 22 and adjustable thereon to move the sleeve 35 longitudinally of the spindle and thus maintain the tapered portions 33 and 34 in tight engagement with the tapered portions 31 and 32 of the bearings 29 and 30. In the particular construction shown it will be apparent that the spindle 22 is securely held against endwise movement in either direction thereby resisting longitudinal thrusts occasioned by the cutting operation, and that any wear of the bearings and spindle may be easily and quickly compensated for by a simple adjustment of the nut 37.

The spindle carrier 18 carries a screw 40 which extends upwardly therefrom and has screw-threaded engagement with sleeve 41 of an adjusting device 42 whereby the carrier may be vertically adjusted in the guides 16 and 17. The sleeve 41 is rotatably mounted in an opening 43 of a cross arm 44 secured to the upper ends of the guides 16 and 17 and is retained therein by a lower flange 45 integral therewith and an upper flanged collar 46 secured thereto in any suitable manner. The flanged portion of the collar 46 has a handle 48 mounted thereon and carries on its outer peripheral surface suitable scale markings 49 which in cooperation with the pointer 50 indicate the adjusted position of the spindle carrier 18. The carrier 18 may be locked in adjusted position by a nut 51 screw-threadedly engaged with the screw 40 and having a handle 52 for manipulation thereof.

The cutter arbor 24 has a tapered or conical end 52 receivable in the similarly shaped tapered bore 23 of the spindle 22 and is likewise tapered at its opposite end as at 54 for cooperation with the tapered bearing 55. The tapered bearing 55 is preferably an oilite or like bearing and is supported in a pendant arm 56 slidably mounted on the over-arms 20 and 21 and adjustably secured in position thereon by the adjusting screws 57. The over-arms 20 and 21 are desirably flattened along their upper portions for cooperation with the adjusting screws 57.

An important feature of this invention is the provision of a tapered center support 59 for the cutter arbor 24. In a preferred construction the support 59 comprises a bearing collar 60 adjustably secured in position on the arbor 24 by the nuts 61 and 62 and having a tapered outer surface 63 journalled in a similarly tapered bearing portion 64 of the pendant arm 65. The pendant arm 65 is slidably mounted on the over-arms 20 and 21 and adjustably secured in position thereon by the adjusting screws 66.

The position of the tapered center support 59 on the arbor 24 may be adjusted as desired by simple manipulation of the nuts 61 and 62 and movement of the pendant arms 65 on the over-arms 20 and 21. This permits the support to be adjustably positioned in close proximity to the cutter to thereby afford maximum support during the cutting operation. Any wear in the center support takes place between the surfaces 63 and 64 and is readily compensated for by adjustment of the pendant arm 65 on the over-arms 20 and 21.

In the arrangement shown the tapered end 54 of the arbor shaft rotates in the tapered bearing 55 so that any wear of the bearing or shaft will take place between the tapered surfaces. This is readily compensated for by adjusting the pendant arm 56 on the over-arms 20 and 21 until all play is taken up and then securing the pendant arm in position by tightening the adjusting screws 57. Likewise, as pointed out above, any wear in the center arbor support will take place between the tapered outer surface 63 of the collar 60 and the tapered bearing portion 64 of the pendant arm 65. This is likewise compensated for by adjusting the arm 65 to take up all play. Thus by simple adjustments of the pendant arms 56 and 65 and the nut 37 the arbor shaft is accurately and tightly journalled and supported at all times so that chatter, vibration and endwise movement of the arbor shaft due to the stresses set up during the cutting operation are substantially eliminated.

Figs. 5, 6 and 7 show a modified form of pendant bearing support 66 adapted for use with the conical ends of different sized arbor shafts. Thus, the bearing 67 is provided with reverse tapers 68 and 69 which vary in size according to the size of the arbor shafts to be journalled. The bearing 67 may be substituted for the bearing 55, if desired, but is preferably secured in the separate pendant arm 66 adapted to be mounted on the over-arms 20 and 21 with the desired conical bearing surface in position for cooperation with the conical end of the arbor shaft. Thus by merely reversing the pendant arm 66 on the over-arms 20 and 21 one or the other of the conical bearings 68 and 69 may be properly positioned to receive the tapered end of a desired size of arbor shaft.

It will thus be seen that the present invention provides an improved mounting construction for the spindle and cutter arbor of a milling machine or the like whereby all wear occasioned by operation of the machine is very easily compensated for by simple mechanical adjustments so that the arbor shaft may be accurately and tightly journalled at all times. This results in greater accuracy, longer life and considerable savings in time and labor.

Although I have illustrated and described a preferred embodiment of the invention I do not intend to be limited to the precise details thereof as the scope of the invention is best defined in the appended claims.

I claim:

1. In a milling machine a movable spindle member having a conical bore therein, an arbor having a conical end positioned in said bore, an outboard arbor bearing support adjustable longitudinally of said arbor and having a conical bearing seat, the outboard end of said arbor having an integral conical terminal pilot bearing surface adapted to seat in said conical bearing seat, a center arbor bearing support having a conical bearing seat oppositely disposed with respect to said first named conical bearing seat, a sleeve member adjustably secured on said arbor and having a tapered bearing surface adapted to cooperate with the conical bearing seat of the center arbor support, and means for securing said outboard arbor bearing support and said center arbor bearing support in adjusted position to maintain said arbor firmly seated in said conical seats.

2. In a milling machine the combination of a base, a work table movably supported on said base, a head mounted on said base and extending upwardly therefrom adjacent an edge of said table, a carrier slidably mounted on said head for vertical movement thereon, a spindle rotatably mounted in said carrier and having tapered bearing supports adjustable to take up wear, said spindle having a tapered opening in one end thereof, over-arms carried by said head and projecting outwardly therefrom transversely of the path of movement of said table, a pendant arm slidably mounted on said over-arms and having a tapered bearing seat mounted therein, a cutter arbor having an integral taper pilot at one end thereof tapered to fit in the tapered opening of said spindle and the other end thereof tapered to fit in said tapered bearing seat, a second pendant arm slidably mounted on said over-arms and having a tapered bearing seat oppositely disposed with respect to said first mentioned tapered bearing seat, a sleeve member adjustably secured on said arbor and having a tapered bearing surface adapted to cooperate with the tapered bearing seat of said second pendant arm, and means for adjustably securing said pendant arms in position on said over-arms so that the tapered ends of the shaft and tapered bearing surface of the sleeve are firmly and tightly held in the tapered opening of the spindle and said tapered bearing seats.

3. In a milling machine the combination of a base, a work table movably supported on said base, a head secured to said base and extending upwardly therefrom adjacent an edge of said table, a carrier member mounted on said head for vertical movement, a spindle mounted in said carrier member and provided with oppositely directed conical bearing surfaces, one of said bearing surfaces being integral with the spindle and the other slidable therealong, conical bearings mounted in said carrier for cooperation with said conical bearing surfaces of said spindle, means for adjusting said movable conical bearing surface toward said integral conical bearing surface to maintain a close fit thereof with said conical bearings, said spindle having a tapered opening in one end thereof, over-arms carried by said carrier member and extending outwardly over said work table, a pendant arm slidably mounted on said over-arms and having a conical bearing secured therein, a cutter arbor having an integral taper pilot at one end thereof tapered to fit in the tapered opening of said spindle and the other end thereof tapered to fit in said conical bearing, and means for adjustably securing said pendant arm on said over-arms to tighten the arbor in said conical bearing surfaces.

4. A milling machine as defined in claim 2 in which the tapered bearings for the spindle are mounted in the opposite ends of the carrier and have inwardly tapering surfaces for bearing engagement with a tapered bearing surface of said spindle.

References Cited in the file of this patent

UNITED STATES PATENTS

| Number | Name | Date |
|---|---|---|
| 661,492 | Burnham | Nov. 13, 1900 |
| 1,545,215 | Sundstrand | July 7, 1925 |
| 1,678,048 | Kearney | July 24, 1928 |
| 1,908,478 | Eisele | May 9, 1933 |
| 1,992,403 | Stuhlmacher | Feb. 26, 1935 |
| 2,192,856 | Nenninger | Mar. 5, 1940 |
| 2,239,567 | Nenninger | Apr. 22, 1941 |
| 2,248,468 | Severson | July 8, 1941 |
| 2,283,154 | Koch | May 12, 1942 |
| 2,343,508 | Hoorn | Mar. 7, 1944 |
| 2,356,506 | Clausen | Aug. 22, 1944 |
| 2,386,461 | Hellman | Oct. 9, 1945 |

FOREIGN PATENTS

| Number | Country | Date |
|---|---|---|
| 229,663 | Great Britain | Oct. 1, 1925 |